United States Patent [19]

Anderson

[11] 4,409,752
[45] Oct. 18, 1983

[54] CRAB TRAP AND METHODS FOR MAKING AND USING

[76] Inventor: George L. Anderson, 8527 Arpe Crescent, Delta, British Columbia, Canada, V4C 3Y2

[21] Appl. No.: 257,796

[22] Filed: Apr. 27, 1981

[51] Int. Cl.³ .................................................. A01K 71/00
[52] U.S. Cl. .................................................. 43/102; 43/105
[58] Field of Search .................... 43/65, 100, 102, 103, 43/105

[56] References Cited

U.S. PATENT DOCUMENTS

| 2,716,304 | 8/1955 | Taylor | 43/100 |
| 3,232,000 | 2/1966 | Gale et al. | 43/100 |
| 3,440,758 | 4/1969 | Prince | 43/100 |
| 3,992,804 | 11/1976 | Senese | 43/100 |
| 4,134,226 | 1/1979 | Petrella | 43/102 |
| 4,237,646 | 12/1980 | Mims | 43/103 |

FOREIGN PATENT DOCUMENTS 11005 of 1900 Finland .................................. 43/102

Primary Examiner—Nicholas P. Godici
Assistant Examiner—Kurt Rowan
Attorney, Agent, or Firm—Seed and Berry

[57] ABSTRACT

A frustoconical crab trap of this invention suitable for catching crustaceans, such as crabs, includes a buoyant entryway collar into which a woven mesh is cast or molded. The net defines an otherwise closed solid and passes around or encircles a tubular member generally in the form of a closed, endless loop In operation, the crab trap of this invention is lowered to the ocean floor, where the loop rests on the floor of the ocean while the foam collar automatically floats above the base. The trap of this invention presents a substantially equally attractive profile to a crab which approaches the trap from any direction.

36 Claims, 3 Drawing Figures

CRAB TRAP AND METHODS FOR MAKING AND USING

DESCRIPTION

1. Technical Field

This invention relates to a novel crab trap and methods for making and using the trap. More particularly, the trap has a buoyant collar to erect the trap automatically when it is submerged.

2. Background Art

Typically, traps for catching crabs or other crustaceans have been box-like structures with entryways fashioned in net on the sides of the trap. Although effective for catching crustaceans, these traps present problems because of their bulkiness. A small boat is unable to handle a great number of traps, limiting the number of traps in a line. Also, the wood or metal which provides a substantial part of these common traps is expensive.

At least three United States patents disclose traps for crustaceans which allow the crustaceans to enter the trap through a central, top opening. In U.S. Pat. Nos. 3,318,039 and 3,319,373, a rigid, resilient plastic, non-buoyant, hemispherical lobster trap comes in two or three portions for transporting. In U.S. Pat. No. 3,300,890, a nestable crab trap uses a non-buoyant, dome-like, substantially rigid frame to support a purse seine net about a rigid central ring. Extending upwardly from the surface of the net, rigid rods of the frame inhibit crabs from climbing the net to the opening.

In U.S. Pat. No. 3,440,758, a collapsible crab trap uses metal bars to make the trap rigid when it is erected. The metal bars hook a buoyant top ring of the trap which rights the trap when it is lowered to the ocean floor. The top ring is not sufficiently buoyant to erect the trap independently of the metal bars but serves only as a selfrighting device. Entrances for crustaceans are large rings on two sides of the cylindrical trap. Smaller escape holes are provided for undersized crustaceans who mistakenly enter the trap. Access to the trap is convenient only from two directions.

In U.S. Pat. No. 2,639,540, a crab trap uses a plurality of buoyant floats about the periphery of its lid and sides to float open the lid and sides when the trap is submerged. The trap has two equal diameter rings concentrically aligned on the same axis and spaced a short distance apart to form a disk. Mesh on the sides, top, and bottom is opened by floats that are attached around the periphery of the mesh. "When the trap is lifted, as by an upper pull of the bail, the weight and exposed surface of the lids and side curtains are sufficient, when exposed to the water pressure thereupon as the trap moves upwardly, to insure that the lids close, and the slidable ring moves to the lowermost position to the slots to close the side curtain." Col. 2, lines 44-51 (reference numerals removed). Thus the floats open entryways to the trap and keep them open until the trap is hauled in. Crustaceans are caught within the trap only when the trap is pulled from the ocean floor so that the pressures and drag created thereby overcome the natural buoyancy of the floats.

DISCLOSURE OF INVENTION

A trap for catching crustaceans, such as crabs, has (a) a base (generally in the shape of a circle), (b) a conical net which is attached to the base to define flexible, inwardly tapering sides for the trap, and (c) a buoyant collar (1) which is smaller in diameter than the diameter of the base, (2) which is attached to the net, and (3) which defines a top entryway into the trap for the crabs or other crustaceans. The buoyant collar floats above the base and automatically erects the trap when the trap is submerged. Crabs or other crustaceans are able to crawl over the fine mesh netting that forms the sides to approach Once the crabs enter the trap through the collar, they are confined in the trap.

Commonly, the sides and bottom of the trap are made of one piece of netting, while the base is defined by a circular tubular member. Preferably, this member is constructed of corrosion-resistant plastic, such as polyethylene, which is filled with sand, gravel, or a mixture thereof to eliminate the natural buoyancy of the plastic. Similarly, the collar is preferably substantially a closed-cell polyurethane providing a natural buoyancy of between about four to fifteen pounds for the trap. The net is preferably a woven mesh having a mesh size over which mature crabs may easily crawl. A nylon mesh having the diameter of between 1/16th and ⅜th inch is suitable. A mesh size of ¼ inch is preferred.

A frustoconical trap is preferred because it presents an equally attractive profile to crabs which approach the trap from any direction. This trap is easily constructed using the method which will be described herein.

To ensure that crabs are able to climb the sides of the trap, the sides slope inwardly at an angle no greater than about 35° with respect to the bottom. Ordinarily, the sides form concave surfaces for the trap's inner volume. If the trap sides are concave, a crab approaching the trap will initially walk over a much less steep angle than if the sides are convex. That is, concave sides initially start out at a small angle and gradually get steeper, while convex sides (such as those shown in U.S. Pat. Nos. 3,318,039 and 3,319,373) begin steep and gradually lessen to a smaller angle as they rise. Convex sides are thought to be a further hindrance to crabs easily entering the trap.

The net is incorporated into the foam of the collar. Making the trap includes the steps of (1) cutting the net into the desired shape, (2) forming the net around a base to define a complete bottom and sides for the trap, (3) draping the loose ends of the net into a mold, and (4) casting foam in the mold to form the buoyant collar. A tubular member to define the base is easily constructed by (1) cutting a strip of plastic tubing, (2) filling the tubing with sand, and (3) hot-welding the ends of the tubing together to form an endless loop. A lap joint may be used to form the generally circular member.

The trap of this invention has been found to be easily emptied. All that need be done is invert it so that the crabs slide out the collar entryway.

BEST MODE FOR CARRYING OUT THE INVENTION

Figure 1:
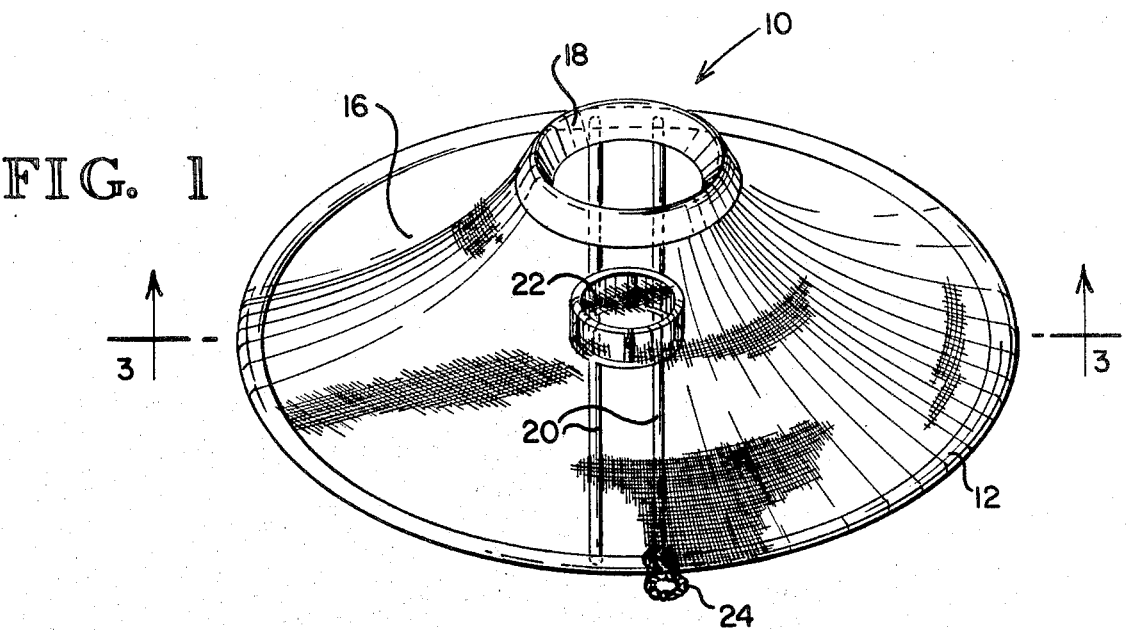
FIG. 1 is a perspective view of a preferred trap of this invention.

Fisheries research indicates that crabs migrate with the tides and will not generally cross them. The crabs are attracted to tide-bound scents and follow them to the source of the food. On encountering a trap which contains food, the crabs generally will not explore around the circumference of the trap to find an opening. Thus it would be advantageous and desirable if a crab trap provided an equally attractive profile to a crab approaching a trap from any direction. A frustoconical, self-erecting crab trap of this invention allows entry from any direction.

Conventional traps are covered with a coarse mesh stainless steel or fabric netting of up to 2 inches in diameter. Crabs have a difficult time negotiating this mesh in the typical tunnel entrance of these traps. Thus it would be advantageous and desirable to develop a trap which uses a fine mesh fabric upon which mature crabs may easily walk.

This invention has found that a woven nylon net having a mesh of between about one-sixteenth and three-eighths inch (1/16" and ⅜" inch) maximum is suitable for the sides and bottom of a crab trap. Furthermore, this machine-woven mesh is commercially available at lower cost than hand-woven stainless steel or fabric nets that are conventionally used.

Most conventional traps have a rigid frame which averages approximatelty 42 inches in circular diameter and 12 inches in height. These traps consume a great volume on a small fishing boat. They require a considerable frame of costly steel or wood in their construction. The volume consumed by the traps seriously limits the capacity of the average fishing boat to carry a commercially profitable quantity of traps. Thus it would be advantageous and desirable to provide a trap which is less expensive and consumes less of a volume on a fishing boat.

The trap of this invention uses a pliable fabric net that collapses when the trap is pulled out of the water to reduce the volume consumed by the traps. The elements of the trap are also cheaper than those of conventional traps. The trap of this invention will probably increase the capacity of a conventional boat by about 400%. When pulled from the water, the trap of this invention forms a volume which is roughly 42 inches in circular diameter but only 2 inches high (the average height of both the buoyant collar entryway and the tubular member which defines the outer base of the trap).

The easy slope up the sides of the trap is important to induce a bottom crawler such as a crab to approach the trap. Conventional traps ordinarily confront the crab with a side which is perpendicular to the bottom of the ocean on which it crawls. Concave sides of the trap of this invention present the bottom crawling crab with the least drastic change in angle orientation as the crab begins to approach the entryway of the trap.

The flotation collar which serves as an entryway to the trap is made from a castable or moldable form of foam plastic, such as closed-cell polyurethane, with a part of the netting cast directly within the foam collar. This method of construction (1) simplifies the attachment of the collar and netting to form the trap, (2) prevents loose fabric ends, (3) provides a more economical method of manufacture for the trap, and (4) does not create a further impediment or obstacle to crabs that a gather of the netting around the collar might otherwise provide. The flotation collar supports the netting above the base when the trap settles to the ocean floor. The preferred conical shape of the trap also directs the flow of water out through the flotation collar opening while the trap settles, ensuring that the trap will land right side up on the ocean floor regardless of how it is thrown into the water.

The frustoconical shape removes the need for a separate, hinged access door to remove a catch. The fisherman instead may readily remove the crabs through the openings of the collar by inverting the trap and shaking the crabs out. In the inverted position, the cone becomes a funnel readily directing the catch out of the opening into a sorting bin and other collection means.

Through a simple design, a novel crab trap can enhance the function and operation of catching crabs and other crustaceans while at the same time reducing the weight, size, and cost of the trap. These novel features make the trap of this invention advantageous and desirable.

Figure 2:
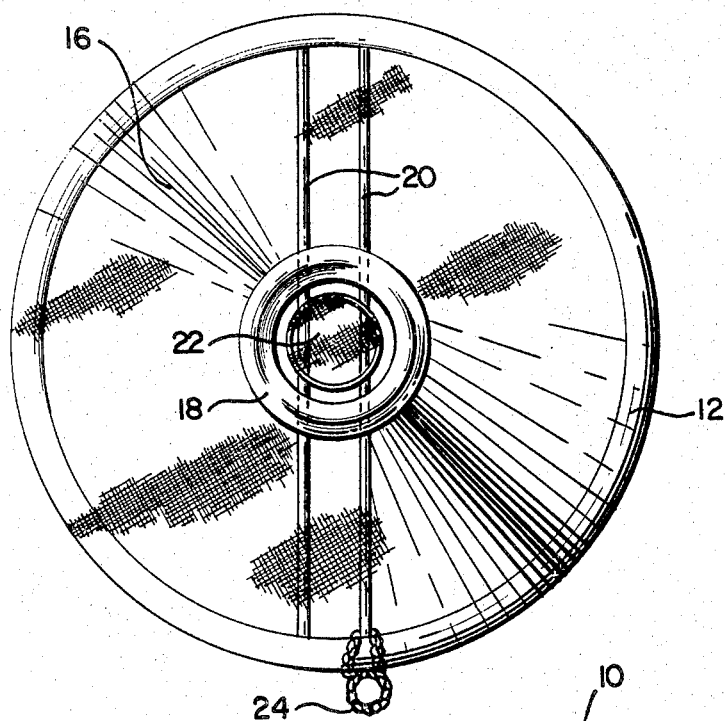
FIG. 2 is a top plan view of a preferred trap of this invention
Figure 3:
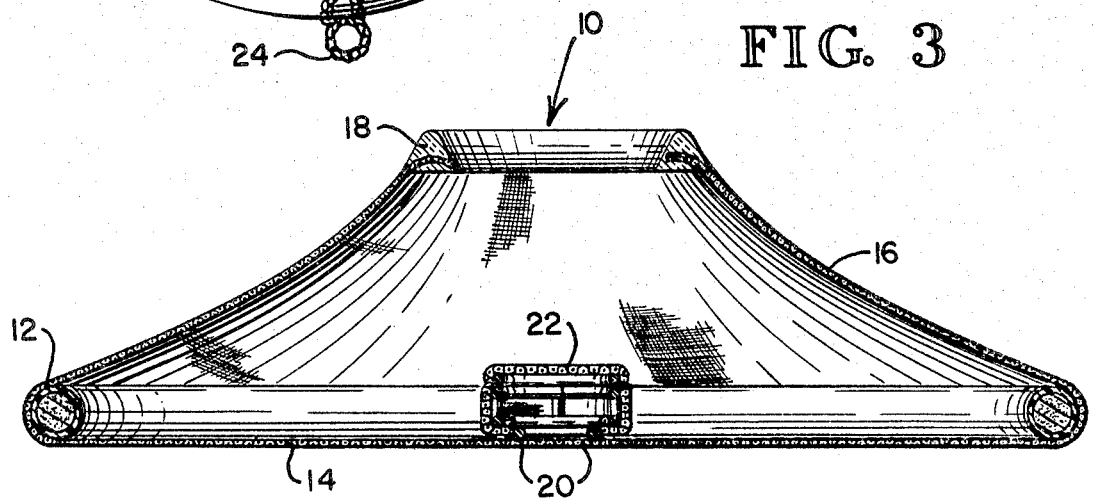
FIG. 3 is a section of the trap taken along line 3—3 of FIG. 1.

Referring now to FIGS. 1, 2, and 3, a preferred crab trap 10 of this invention comprises (1) a base 12, (2) flexible, inwardly tapering sides 16, and (3) a buoyant collar 18 which is smaller in diameter than the base 12 and which defines a top entryway for crustaceans to enter the trap. The base 12 is constructed of a generally circular tubular member that defines the outside periphery of the bottom of the trap and a net mesh 14 which defines the complete bottom for the trap. Other bases may be used, such as those suggested in U.S. Pat. Nos. 3,318,039 or 3,319,373. The base 12 serves to define the outside rigid structure of the trap. It should provide an uninhibited access for crabs or other crustaceans which approach the trap.

The sides 16 of the preferred trap 10 of this invention are constructed of a finely woven nylon mesh which is suitable for purse seine fishing and over which mature crabs may easily walk. The sides 16 are raised above the base by the smaller diameter buoyant collar 18 into which the ends of the sides 16 are molded or cast. The collar 18 preferably is constructed of a closed-cell polyurethane and provides a positive buoyancy for the trap of between about four and fifteen pounds. More preferably, the buoyant collar 18 provides between about eight and ten pounds positive buoyancy for the trap. In any event, because the average weight of a mature crab is approximately two pounds while the crab is underwater, the collar 18 should provide at least about four pounds positive buoyancy for the trap. The collar 18 may include other materials in the polyurethane, such as a metal ring to which the end of the net is attached, or some other buoyant means, such as cork or wood, to provide structural rigidity or added buoyancy as preferred.

Making the trap of a polyurethane collar 18, sides 16, a bottom 14 of woven nylon mesh, and a tubular member in the form of a loop of corrosion-resistant plastic (such as polyethylene filled with sand, gravel, or a mixture thereof) provides a trap which is lightweight, inexpensive, and suitable for extended use. This trap overcomes many of the difficulties encountered with conventional traps and provides many features found advantageous and desirable in a trap.

A trap 10 may further include a plurality of structural support rods 20 extending across the trap and connecting at both ends to the tubular member of the base 12. Rods 20 are especially desirable if the tubular member is made of thin stainless steel or some other suitable metal. They are unnecessary with a plastic, sand-filled ring. Conveniently, the rods 20 may be used to attach a bait box 22 centrally in the trap so that, when the trap is erected in the ocean, the collar 18 floats substantially directly above the bait box 22. The bait box 22 is of the conventional type. To allow easy raising and lowering of the trap and to ensure the trap does not get lost when lowered to the ocean floor, a loop 24 of spliced rope, plastic, or metal is attached around the tubular member through the net which forms the base 14 and sides 16.

To make a trap of this invention, a piece of net is cut and draped around the tubular member to form a completely closed bottom. The ends of the net are gathered together to define roughly the sides of the frustoconical trap. The net and tubular member are then lowered in place upon a support rack in the center of which is a mold. The loose ends of the net are placed in the mold. Excess net is cut away so that the ends of the net terminate roughly in the center of the mold. A plastic, such as closed-cell polyurethane, is injected into the mold and the mold is capped. The plastic is cured, capturing the loose ends of the net within it. Finally, the foam collar is released from the mold to complete construction of the trap.

If structural support rods 20 are not used, the bait box 22 may be attached to the net bottom 14 by any suitable means or may be made an integral part of the bottom, if so desired. Alternatively, the bait may be attached to the trap by some means other than through a conventional bait box 22 as shown in the drawings.

The net is shaped to define a volume which is capable of retaining a crab or another crustacean that enters the trap through the buoyant collar. For example, a crab would remain in a trap having inwardly tapering sides because it does not like to crawl upside down. To ensure that the crabs remain in the trap, however, a non-exit device may be used. For example, the non-exit device may be of the type shown either in U.S. Pat. No. 3,300,890 or U.S. Pat. No. 3,319,373. Such a non-exit device may be incorporated into the collar as an integral feature of the collar when it is being molded or the device may be a separate loop in the foam or attached to the foam. To ensure that the method of emptying the trap is the most efficient, it is preferred that a non-exit device not be used unless its use is necessary to retain crustaceans within the trap when the trap is submerged.

I claim:

1. A trap for catching crustaceans, such as crabs, comprising:
   (a) a base defining the bottom of the trap;
   (b) a net attached to the base defining flexible, inwardly tapering sides of the trap; and
   (c) an annular buoyant collar having a smaller perimeter than the base, attached to the net, an inner opening of said collar defining a top entryway for the trap, and floating above the base when the trap is used, the buoyancy of the collar providing the sole means for erecting the trap,
   wherein the base, net, and collar define a volume for the trap capable of retaining crustaceans which enter the trap through the collar, wherein the collar is the only entryway into the trap, and wherein the trap is collapsible for flat storage when not in use.

2. The trap of claim 1, further comprising a bait box positioned on the base within the volume defined by the base, net, and collar.

3. The trap of claim 1, further comprising means for raising and lowering the trap attached to the base.

4. A crab trap comprising:
   (a) a member defining the perimeter of the bottom of the trap;
   (b) a net encircling the member and defining a net bottom and sides for the trap; and
   (c) a buoyant collar attached to the net an inner opening of said collar defining a top entryway for crabs into the trap and floating above the bottom when the trap is used,
   wherein the member, net, and collar define a volume capable of retaining crabs which enter the trap through the collar, the entryway of the collar being the only entryway into the trap, the buoyancy of the collar being the sole means for erecting the trap, and the trap being collapsible for substantially flat storage when not in use.

5. The trap of claim 4, further comprising structural support rods spanning the bottom of the trap and attached to the member.

6. The trap of claim 4 or claim 5, further comprising a bait box attached to the bottom of the trap within its volume.

7. The trap of claim 4 wherein the collar is substantially a foam.

8. The trap of claim 7 wherein the net is incorporated into the foam during casting of the collar.

9. The trap of claim 7 wherein the collar provides at least about four pounds positive buoyancy.

10. A crab trap comprising:
    (a) a member defining the perimeter of the bottom of the trap and having a corrosion-resistant external surface;
    (b) a net encircling the member and defining a net bottom and sides of the trap; and
    (c) a foam collar, which has the net incorporated into the foam during casting, an inner opening of said collar defining a top entryway for crabs into the trap, and floating above the bottom of the trap when the trap is used, the buoyancy of the collar providing the means for erecting the trap,
    wherein the member, net, and collar define a volume capable of containing crabs which enter the trap through the collar, the trap is collapsible for flat storage, and the collar is the sole entryway into the trap.

11. The trap of claim 10 wherein the member is a plastic.

12. The trap of claim 10 wherein the member is an endless loop.

13. The trap of claim 10 wherein the net is a woven mesh suitable for purse seine fishing and having a mesh size over which mature crabs may easily walk.

14. A trap of claim 13 wherein the collar is substantially a closed-cell polyurethane foam.

15. A generally frustoconical crab trap comprising:
    (a) a substantially circular, endless loop defining the perimeter of the bottom of the trap;
    (b) a net encircling the loop defining a net bottom and sides of the frustoconical trap; and
    (c) a buoyant collar attached to the net an inner opening of said collar defining a top entryway for crabs into the trap and floating above the bottom when the trap is used, the buoyancy of the collar making the trap self-erecting, wherein (1) the loop, net and collar define a volume capable of retaining crabs which enter the traps through the collar, (2) the trap presents a substantially equally attractive profile to crabs which approach the trap from any direction, and (3) the entryway through the collar is the only entryway into the trap.

16. The trap of claim 15 wherein the net is a woven mesh having a mesh size over which mature crabs may easily walk.

17. The trap of claim 15 or 16 wherein the sides of the trap slant inwardly from the loop to the collar at no greater than about 35° degrees with respect to the bottom.

18. The trap of claim 17 wherein the sides of the trap form concave sides for the trap's internal volume.

19. A generally frustoconical crab trap comprising:
    (a) a substantially circular, endless loop defining the perimeter of the bottom of trap and having a substantially corrosion-resistant exterior;
    (b) a net encircling the loop and defining a net bottom and sides of the frustoconical trap; and
    (c) a buoyant foam collar, which has the net cast within it, an inner opening of said collar defining a top entryway for crabs into the trap and floating above the bottom when the trap is used, wherein (1) the loop, net, and collar define a volume capable of retaining crabs which only enter the trap through the collar, (2) the trap presents a substantially equally attractive profile to crabs which approach the trap from any direction, and (3) the trap is collapsible for substantially flat storage.

20. The trap of claim 19 wherein the foam is a closed-cell polyurethane.

21. The trap of claim 19 wherein the collar provides at least about four pounds positive buoyancy.

22. The trap of claim 19 wherein the collar provides between about four to fifteen pounds positive buoyancy.

23. The trap of claim 19 wherein the collar provides between about eight to ten pounds positive buoyancy.

24. The trap of claim 19 wherein the loop is a plastic tube filled with a non-buoyant material.

25. The trap of claim 23 wherein the non-buoyant material is sand.

26. The trap of claim 19, further comprising a bait box positionable within the volume of trap substantially directly below the collar so that when the trap is stored in collapsed form, the bait box nests within the collar.

27. The trap of claim 26, further comprising a ring attached around the loop to allow raising and lowering of the trap.

28. The trap of claim 21 wherein the net is woven mesh having a mesh size over which mature crabs may easily walk.

29. The trap of claim 28 wherein the mesh size is no greater than about three-eighths inch.

30. The trap of claim 28 wherein the mesh size is between one-sixteenth and three-eighths inch.

31. A generally frustoconical crab trap comprising:
    (a) a substantially circular, endless loop defining the perimeter of the bottom of the trap and having a substantially corrosion-resistant exterior, the loop causing the trap to sink when used;
    (b) a net encircling the loop and defining a net bottom and sides of the frustoconical trap; and
    (c) a circular buoyant collar substantially of closed-cell foam, which has the net cast within it, defining an unrestricted top entryway within the circumference of the collar so that crabs can enter the trap, the trap floating above the bottom when the trap is used;
    (d) a detachable bait box positionable in the trap's volume through the collar; and
    (e) a means attached to the loop for raising and lowering the trap, wherein (1) the loop, net, and collar define a volume capable of retaining crabs which enter the trap through the collar, (2) the trap presents an equally attractive profile to the crabs which approach the trap across the net from any direction, (3) the net has a mesh size over which mature crabs may readily walk to approach the collar from any direction, the mesh being between about 1/16-⅜ inch in size, (4) the trap being collapsible for flat storage, (5) the collar being the sole entryway to the trap, and (6) the buoyancy of the collar being sufficient to self-erect the trap in use by providing at least four pounds positive buoyancy.

32. The trap of claim 31 wherein the sides of the trap extend inwardly from the loop to the collar at no greater than about 35° with respect to the bottom.

33. The trap of claim 32 wherein the sides form concave sides for the trap's internal volume.

34. A method for making a trap, comprising the steps of:
    (a) cutting a net to the desired shape;
    (b) forming a base defining the perimeter of the bottom of a trap;
    (c) encircling the base with the net to define a complete bottom and sides (with loose net ends roughly defining a top for the trap); and
    (d) molding the net ends into a foam collar to define a top entryway for the trap.

35. The method of claim 34 wherein the step of forming the base includes the steps of:
    (a) cutting a strip of plastic tubing;
    (b) filling the tubing with sand; and
    (c) hot-welding the ends of the tubing together to form an endless loop.

36. The method of claim 34 or 35, further comprising the step of sewing the net to define roughly a cone after encircling the base but before molding the collar.

* * * * *